(12) United States Patent
Stattin et al.

(10) Patent No.: US 10,973,074 B2
(45) Date of Patent: Apr. 6, 2021

(54) SYSTEMS AND METHODS FOR BEARER STATE MISMATCH AVOIDANCE

(71) Applicant: Telefonaktiebolaget LM Ericsson (publ), Stockholm (SE)

(72) Inventors: Magnus Stattin, Upplands Väsby (SE); Paul Schliwa-Bertling, Ljungsbro (SE); Mikael Wass, Sätila (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/343,211

(22) PCT Filed: Oct. 20, 2017

(86) PCT No.: PCT/IB2017/056552
§ 371 (c)(1),
(2) Date: Apr. 18, 2019

(87) PCT Pub. No.: WO2018/073811
PCT Pub. Date: Apr. 26, 2018

(65) Prior Publication Data
US 2019/0254107 A1    Aug. 15, 2019

Related U.S. Application Data

(60) Provisional application No. 62/411,162, filed on Oct. 21, 2016.

(51) Int. Cl.
*H04W 76/27* (2018.01)
*H04W 76/34* (2018.01)
*H04W 76/36* (2018.01)

(52) U.S. Cl.
CPC .......... *H04W 76/27* (2018.02); *H04W 76/34* (2018.02); *H04W 76/36* (2018.02)

(58) Field of Classification Search
None
See application file for complete search history.

(56) References Cited

U.S. PATENT DOCUMENTS

2013/0136114 A1*  5/2013  Hietalahti ............. H04W 76/50
                                                          370/338
2019/0021134 A1*  1/2019  Zhang ............... H04W 36/0033
2019/0174571 A1*  6/2019  Deenoo ................. H04W 76/11

FOREIGN PATENT DOCUMENTS

GB         2489545 A       10/2012

OTHER PUBLICATIONS

3GPP TSG CT WG1 Meeting #93; Vancouver (Canada); Source: Qualcomm Incorporated, NTT Docomo; Title: Avoiding mismatch of EPS bearer context status information (C1-152857)—Aug. 17-21, 2015.

(Continued)

*Primary Examiner* — Diane L Lo
(74) *Attorney, Agent, or Firm* — Baker Botts, LLP

(57) ABSTRACT

According to certain embodiments, a method (400) by user equipment (UE) (300) is provided for avoiding bearer state mismatch that includes storing, by the UE, a passive context for use in resuming a connection with a network node (600). While the UE is in an inactive state, the UE locally deactivates at least one radio bearer. The UE signals, to the network node, an indication that the at least one radio bearer has been deactivated locally and the network node consequently modifies the stored bearer context.

17 Claims, 9 Drawing Sheets

(56) References Cited

OTHER PUBLICATIONS

3GPP TSG CT4 Meeting #72bis; Ljubljana (Slovenia); Discussion on Bearer Context Mismatch with Racing Conditions (C4-162044)—Apr. 11-15, 2016.
PCT International Search Report for International application No. PCT/IB2017/056552—Feb. 9, 2018.
PCT Written Opinion of the International Searching Authority for International application No. PCT/IB2017/056552—Feb. 9, 2018.
3GPP TSG-RAN WG2 Meeting #95bis; Kaohsiung; Source: Huawei, HiSilicon; Title: Signalling and Procedures for states transition and PAU (R2-166629)—Oct. 10-14, 2016.
3GPP TSG-RAN WG2 Meeting #95bis; Kaohsiung, Taiwan; Source: LG Electronics Inc.; Title: Use of RRC Connection Reconfiguration procedure for a UE to enter to lightweight connection (R2-167038)—Oct. 10-14, 2016.

\* cited by examiner a U.S. National Stage
SYSTEMS AND METHODS FOR BEARER STATE MISMATCH AVOIDANCE

PRIORITY

This nonprovisional application is a U.S. National Stage Filing under 35 U.S.C. § 371 of International Patent Application Serial PCT/IB2017/056552 filed Oct. 20, 2017 and entitled "SYSTEMS AND METHODS FOR BEARER STATE MISMATCH AVOIDANCE" which claims priority to U.S. Provisional Patent Application No. 62/411,162 filed Oct. 21, 2016 both of which are hereby incorporated by reference in their entirety.

TECHNICAL FIELD

The present disclosure relates, in general, to wireless communications and, more particularly, to systems and methods for avoiding bearer state mismatch.

BACKGROUND

In LTE, data can be transported over Evolved Packet System (EPS) bearers defined between User Equipment (UE) and Core Network (CN). This is referred to as the Non-Access Stratum (NAS) layer. Over the radio interface between UE and Radio Access Network (RAN) node, EPS bearers can be mapped on (Data) Radio Bearers ((D)RBs). This may be referred to as the Access Stratum (AS) layer. In LTE, there is a one-to-one mapping between EPS bearers of the NAS layer and (D)RBs of the AS layer. Similar concepts and variants thereof exist for other radio access technologies and may apply for new radio access technologies.

In 3GPP Rel-13, there is a new feature for Suspend and Resume of Radio Resource Control (RRC) context. This feature is described in 3GPP TS 36.300 v13.5.0 and 3GPP TS 36.331 v13.3.0, the entireties of which are hereby incorporated by reference. The general idea is that when a User Equipment (UE) session ends and the UE goes to RRC idle, both the UE and RAN keep a passive UE context; only the RRC connection is suspended. This passive UE context can be re-activated with a slim resume procedure, which causes the suspended RRC connection to be resumed. The use of the resume procedure leads to a fast setup of radio resources, which means low latency for the system and end-users and efficient execution of the procedure in the system.

Specifically, the UE requesting to re-activate or resume a passive UE context signals a request to resume the connection associated with the passive/cached UE context. For example, the UE requests to re-use and re-activate the passive/cached context. However, the S1 connection is typically released upon suspension of the RRC connection. Upon resumption of the RRC connection, the S1 connection is reactivated and/or restored.

In 3GPP, a Rel-14 Work Item on "Signaling reduction to enable light connection for LTE" aims to further enhance the connection handling by, for example, maintaining the S1 connection while the RRC connection is suspended. In this scenario, the UE context is passive.

Work on 5G mobile communication system and a New Radio interface (NR) is also ongoing in 3GPP. For NR and 5G similar concepts with passive UE context, the possibility to keep the connection between Radio Access Network (RAN) and Core Network (CN) when the connection between the UE and the radio access network is released or enters an inactive or passive state are being considered. These concepts are discussed, for example, in 3GPP TS 23.799 v1.0.2, the entirety of which is hereby incorporated by reference.

When the UE is in an inactive state such as, for example, an RRC idle or suspended state, the UE can locally deactivate bearers defined between UE and Core Network (CN). For example, the UE can locally deactivate EPS bearers in the context of LTE. When the UE is in RRC idle state without a passive/cached RRC UE context and a bearer is locally deactivated in the UE, the UE can indicate this to the CN. Although RRC idle or suspended state are used as examples of "inactive state" herein, it will be appreciated that the solutions described herein may apply to any suitable inactive state, whether currently defined or not, in LTE, NR, or any other appropriate wireless technology. These may include, without limitation, RRC_IDLE and RRC_INACTIVE states. In the context of LTE, the UE may indicate the deactivation to the mobile management entity (MME); however, other appropriate CN nodes may be notified depending on the radio technology so that the CN can instruct the RAN node to establish RBs only for active bearers such to ensure, for example, synchronized bearer states between UE and CN and RAN. In LTE, the UE synchronizes the state of the bearers with the MME through, for example, a NAS Extended Service Request (ESR) or Tracking Area Update Request (TAUR) message containing the EPS bearer context status information element, which is discussed in more detail in 3GPP TS 24.301 v13.7.0, which is hereby incorporated by reference in its entirety.

However, when the UE is in RRC idle state with a passive/cached RRC UE context and a bearer is locally deactivated in the UE, the RB(s) associated with the deactivated EPS bearer(s) will be reestablished as part of the re-activation/resume of the RRC context/connection, which is triggered when the UE accesses the network. Because the RBs will be reestablished before the CN is made aware of the UE's local bearer deactivation, a bearer state mismatch occurs between the UE, the CN, and the RAN node and between NAS and AS. The state mismatch can lead to loss of data.

SUMMARY

To address the foregoing problems with existing solutions, disclosed are systems and methods for avoiding bearer state mismatch.

According to certain embodiments, a method by user equipment (UE) is provided for avoiding bearer state mismatch that includes storing, by the UE, a passive context for use in resuming a connection with a network node. While the UE is in an inactive state, the UE locally deactivates at least one radio bearer (RB). The UE signals, to the network node, an indication that the at least one RB was deactivated locally while in the inactive state.

According to certain embodiments, a UE for avoiding bearer state mismatch is provided. The UE includes a memory storing instructions and processing circuitry configured to execute the instructions to cause the UE to store a passive context for use in resuming a connection with a network node. While the UE is in an inactive state, at least one RB is locally deactivated at the UE. The UE signals, to the network node, an indication that the at least one RB was deactivated locally while in the inactive state.

According to certain embodiments, a method for avoiding bearer state mismatch by a network node is provided that includes storing, by the network node, a passive context for use in resuming a connection with a UE that is in an inactive state. The network node receives, from the UE, an indication that at least one RB was deactivated locally at the UE while in the inactive state. A bearer state associated with the UE is modified, by the network node, to avoid bearer state mismatch.

According to certain embodiments, a network node for avoiding bearer state mismatch is provided. The network node includes a memory storing instructions and processing circuitry configured to execute the instructions to cause the network node to store a passive context for use in resuming a connection with a UE that is in an inactive state. The network node receives, from the UE, an indication that at least one RB was deactivated locally at the UE while in the inactive state. A bearer state associated with the UE is modified, by the network node, to avoid bearer state mismatch.

Certain embodiments of the present disclosure may provide one or more technical advantages. For example, certain embodiments may provide a mechanism for a UE to indicate to a network node that a local change of bearer state has occurred. For example, in particular embodiments, the notification from the UE may indicate that the current passive/stored/cached UE Access Stratum (AS) context may not be up-to-date and/or valid with respect to RB(s) configuration and/or state. Another technical advantage may be that, in response to such an indication from the UE, the network node can take actions to avoid error cases caused by bearer configuration/state mismatch between the UE and the network and between the AS and the Network Access Stratum (NAS). For example, in particular embodiments, the network node may release, suspend, or delay reestablishment of RB(s), thus avoiding mismatch in bearer configurations and/or states. Thus, data loss associated with bearer state mismatches may be minimized or avoided altogether.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
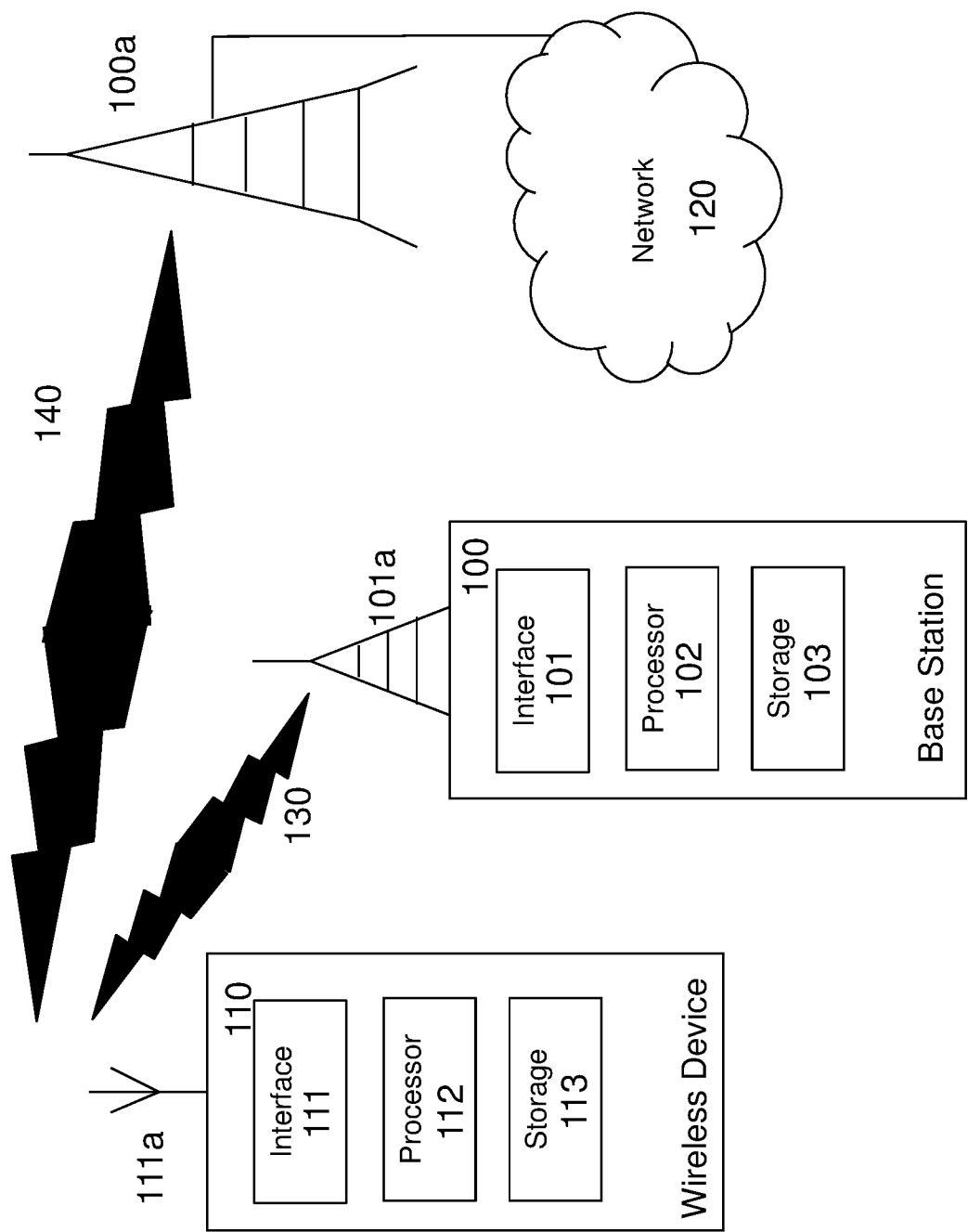
FIG. 1 illustrates an exemplary wireless communication network for avoiding bearer state mismatch, according to certain embodiments.

Particular embodiments of the present disclosure may provide solutions for avoiding bearer state mismatch by a wireless device and a network node. According to certain embodiments, a wireless device, such as a user equipment (UE) may indicate to a network node, such as a Radio Access Network (RAN) node, that a local change of bearer state has or may have occurred. Such an indication enables the network node to release, suspend or delay reestablishment of radio bearer(s) (RB(s)) to avoid mismatch in bearer configurations and/or states. The various embodiments will be discussed in more detail below.

According to particular embodiments, the wireless device indicates to the network node, when accessing the network, that one or more bearers have been locally deactivated. In a particular embodiment, the indication may identify one or more RBs that have been locally deactivated. Additionally or alternatively, the indication may identify one or more RBs that were not deactivated or are still active.

According to particular embodiments, this indication may be in the request to resume or reactive the inactive/suspended Radio Resource Control (RRC) connection or the passive/cached context. For example, in LTE, the indication may be in an RRCConnectionResumeRequest message or another corresponding message. In another embodiment, the indication may be in a confirmation of successful resume or reactivation. For example, in LTE, the indication may be in an RRCConnectionResumeComplete message or another corresponding message.

According to certain embodiments, when receiving an indication that one or more RBs have been locally deactivated, the network node may release, suspend, or delay reestablishment of the RBs. According to particular embodiments, the release, suspension, or delay of reestablishment of one or more RBs may be done selectively, based on wireless device indication of which RBs have been deactivated. Additionally or alternatively, the release, suspension or delay of reestablishment of the one or more RBs may be done non-selectively in the absence of such a detailed indication from the wireless device. Release, suspension, or delay of reestablishment of one or more RBs may be performed until the core network (CN) indicates that bearer state has been synchronized and/or which RBs are active/established and/or which RBs are deactivated/released and/or corresponding bearer configurations. Upon receiving such indication from the CN, the network node may configure the wireless device and the network nodes with RBs, correspondingly.

According to particular embodiments, the network node can indicate to the CN over a RAN-CN interface that a change of bearer configuration and/or state is expected or pending and/or that the RAN needs updated bearer information and/or state. In LTE, for example, an eNB may indicate to the mobile management entity (MME) over the S1 interface that a change of bearer configuration and/or state is expected and/or pending and/or that the RAN needs updated bearer information and/or state. In response to such an indication or request, the CN may provide the RAN with updated bearer configuration and/or state information.

According to particular embodiments, when receiving an indication that one or more bearers have been locally deactivated, the network node releases the connection and moves the wireless device to RRC idle state without passive/ cached/stored UE context. The UE then initiates a procedure to establish a new RRC connection.

In other particular embodiments, when receiving an indication that one or more bearers have been locally deactivated, the network node may ignore or discard a passive/cached/stored UE context and initiate establishment of a new RRC connection. For example, the network node may switch from the connection resume procedure to a connection setup procedure. For instance, in LTE, this may be accomplished by responding to an RRCConnectionResumeRequest with an RRCConnectionSetup message instead of with an RRCConnectionResume message if the wireless device indicates that one or more bearers have been locally deactivated.

In yet other particular embodiments, bearer mismatch between AS and NAS layers is prevented by a rule that when a bearer has been locally deactivated the UE will request a new RRC connection to be established instead of requesting the inactive/suspended RRC connection or the passive/cached context to be resumed or reactivated.

In other particular embodiments, one or more of the above indications and/or rules may be applied when a bearer has been locally modified or a modification is about to be requested.

Throughout this document, the general terms UE, RAN node, and CN node may be used. It will be appreciated that specific names and terminology may vary with architecture and access technology. For instance, in LTE the network or RAN node may be an eNB, and the CN node may be an MME. Example nodes and apparatuses are described in more detail below. However, the solutions described herein may be implemented in any appropriate type of system using any suitable components.

Particular embodiments are described in FIGS. 1-9 of the drawings, like numerals being used for like and corresponding parts of the various drawings. FIG. 1 illustrates an exemplary wireless communication network for avoiding bearer state mismatch, according to certain embodiments. As depicted, the wireless communication network provides communication and other types of services to one or more wireless devices 110, which may include UEs. In the illustrated embodiment, the wireless communication network includes one or more instances of network nodes 100 and 100a that facilitate the wireless devices' access to and/or use of the services provided by the wireless communication network. The wireless communication network may further include any additional elements suitable to support communication between wireless devices 110 or between a wireless device 110 and another communication device, such as a landline telephone.

Network 120 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

The wireless communication network may represent any type of communication, telecommunication, data, cellular, and/or radio network or other type of system. In particular embodiments, the wireless communication network may be configured to operate according to specific standards or other types of predefined rules or procedures. Thus, particular embodiments of the wireless communication network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, and/or ZigBee standards.

For simplicity, FIG. 1 only depicts network 120, network nodes 100 and 100a, and wireless device 110. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

FIG. 1 shows a detailed view of network node 100 and wireless device 110, in accordance with a particular embodiment. Network node 100 includes an interface 101, a processor 102, storage 103, and an antenna 101a. Similarly, wireless device 110 includes an interface 111, a processor 112, storage 113, and an antenna 111a. These components may work together in order to provide network node and/or wireless device functionality, such as providing wireless connections in the wireless communications network.

As used herein, the term "network node", which may also be referred to as a RAN node, refers to equipment capable, configured, arranged and/or operable to communicate directly or indirectly with a wireless device 110 and/or with other equipment in the wireless communication network that enable and/or provide wireless access to the wireless device 110. Examples of network nodes 100 and 100a include, but are not limited to, access points (APs), in particular radio access points. A network node 100 and 100a may represent base stations (BSs), such as radio base stations. Particular examples of radio base stations include Node Bs, and evolved Node Bs (eNBs). Base stations may be categorized based on the amount of coverage they provide (or, stated differently, their transmit power level) and may then also be referred to as femto base stations, pico base stations, micro base stations, or macro base stations. Network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base stations may also be referred to as nodes in a distributed antenna system (DAS).

As a particular non-limiting example, a base station may be a relay node or a relay donor node controlling a relay.

Other examples of network nodes 100 and 100a include multi-standard radio (MSR) radio equipment such as MSR BSs, network controllers such as radio network controllers (RNCs) or base station controllers (BSCs), MBMS nodes, base transceiver stations (BTSs), transmission points, transmission nodes, Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network nodes 100 and 100a may represent any suitable device (or group of devices) capable, configured, arranged, and/or operable to enable and/or provide a wireless device access to the wireless communication network or to provide some service to a wireless device 110 that has accessed the wireless communication network.

As used herein, the term "radio node" is used generically to refer both to wireless devices 110 and network nodes 100 and 100a, as each is respectively described above.

As depicted in FIG. 1, network node 100 includes a processor 102, storage 103, interface 101, and antenna 101a. These components are depicted as single boxes located within a single larger box. In practice however, a network node 100 may comprise multiple different physical components that make up a single illustrated component (e.g., interface 201 may comprise terminals for coupling wires for a wired connection and a radio transceiver for a wireless connection). As another example, network node 100 may be a virtual network node in which multiple different physically separate components interact to provide the functionality of network node 100. For example, processor 102 may comprise three separate processors located in three separate enclosures, where each processor is responsible for a different function for a particular instance of network node 100). Similarly, network node 100 may be composed of multiple physically separate components. In a particular embodiment, for example, network node 100 may be composed of a NodeB component and a RNC component, a BTS component and a BSC component, or other suitable components, which may each have their own respective processor, storage, and interface components. In a particular embodiment in which network node 100 includes multiple separate components, one or more of the separate components may be shared among several network nodes. For example, a single RNC may control multiple NodeBs. In such a scenario, each unique NodeB and BSC pair, may be a separate network node. In some embodiments, network node 100 may be configured to support multiple radio access technologies (RATs). In such embodiments, some components may be duplicated. For example, a separate storage 103 may be included for each of the different RATs. In some embodiments, some components may be reused. For example, the same antenna 101a may be shared by the different RATs, in a particular embodiment.

Processor 102 may be a combination of one or more of a microprocessor, controller, microcontroller, central processing unit, digital signal processor, processing circuitry, application specific integrated circuit, field programmable gate array, or any other suitable computing device, resource, or combination of hardware, software and/or encoded logic operable to provide, either alone or in conjunction with other network node 100 components, such as storage 103, network node 100 functionality. For example, processor 102 may execute instructions stored in storage 103. Such functionality may include providing various wireless features discussed herein to a wireless device 110 including any of the features or benefits disclosed herein.

Storage 103 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 103 may store any suitable instructions, data or information, including software and encoded logic, utilized by network node 100. Storage 103 may be used to store any calculations made by processor 102 and/or any data received via interface 101.

Network node 100 also comprises interface 101 which may be used in the wired or wireless communication of signaling and/or data between network node 100, network 120, and/or wireless device 110. For example, interface 101 may perform any formatting, coding, or translating that may be needed to allow network node 100 to send and receive data from network 120 over a wired connection. Interface 101 may also include a radio transmitter and/or receiver that may be coupled to or a part of antenna 101a. The radio may receive digital data that is to be sent out to other network nodes 100 or wireless devices 110 via a wireless connection 130, 140. The radio may convert the digital data into a radio signal having the appropriate channel and bandwidth parameters. The radio signal may then be transmitted via antenna 101a to the appropriate recipient, such as wireless device 110.

Antenna 101a may be any type of antenna capable of transmitting and receiving data and/or signals wirelessly. In some embodiments, antenna 101a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

As used herein, "wireless device" refers to a device capable, configured, arranged and/or operable to communicate wirelessly with network nodes and/or another wireless device. Communicating wirelessly may involve transmitting and/or receiving wireless signals using electromagnetic signals, radio waves, infrared signals, and/or other types of signals suitable for conveying information through air. In particular embodiments, wireless devices 110 may be configured to transmit and/or receive information without direct human interaction. For instance, a wireless device 110 may be designed to transmit information to a network on a predetermined schedule, when triggered by an internal or external event, or in response to requests from the network. Generally, a wireless device 110 may represent any device capable of, configured for, arranged for, and/or operable for wireless communication, for example radio communication devices. Examples of wireless devices 110 include, but are not limited to, user equipment (UE) such as smart phones. Further examples include wireless cameras, wireless-enabled tablet computers, laptop-embedded equipment (LEE), laptop-mounted equipment (LME), USB dongles, and/or wireless customer-premises equipment (CPE).

As one specific example, a wireless device 110 may represent a UE configured for communication in accordance with one or more communication standards promulgated by the 3$^{rd}$ Generation Partnership Project (3GPP), such as 3GPP's GSM, UMTS, LTE, and/or 5G standards. As used herein, a "user equipment" or "UE" may not necessarily have a "user" in the sense of a human user who owns and/or operates the relevant device. Instead, a UE may represent a device that is intended for sale to, or operation by, a human user but that may not initially be associated with a specific human user.

In a particular embodiment, wireless device 110 may support device-to-device (D2D) communication, for example by implementing a 3GPP standard for sidelink communication, and may in this case be referred to as a D2D communication device.

As yet another particular embodiment, in an Internet of Things (IoT) scenario, a wireless device 110 may represent a machine or other device that performs monitoring and/or measurements, and transmits the results of such monitoring and/or measurements to another wireless device 110 and/or a network node 100. The wireless device 110 may in this case be a machine-to-machine (M2M) device, which may in a 3GPP context be referred to as a machine-type communication (MTC) device. As one particular example, the wireless device 110 may be a UE implementing the 3GPP narrow band internet of things (NB-IoT) standard. Particular examples of such machines or devices are sensors, metering devices such as power meters, industrial machinery, or home or personal appliances such as, for example, refrigerators, televisions, personal wearables such as watches, and other devices. In other scenarios, a wireless device 110 may represent a vehicle or other equipment that is capable of monitoring and/or reporting on its operational status or other functions associated with its operation.

A wireless device 110 as described above may represent the endpoint of a wireless connection, in which case the device may be referred to as a wireless terminal. Furthermore, a wireless device 110 as described above may be mobile, in which case it may also be referred to as a mobile device or a mobile terminal.

As depicted in FIG. 1, wireless device 110 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 100 and/or other wireless devices 110. Wireless device 110 includes a processor 112, storage 113, interface 111, and antenna 111a. Like network node 100, the components of wireless device 110 are depicted as single boxes located within a single larger box, however in practice a wireless device may comprises multiple different physical components that make up a single illustrated component (e.g., storage 113 may comprise multiple discrete microchips, each microchip representing a portion of the total storage capacity).

Processor 112 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other wireless device 110 components, such as storage 113, wireless device 110 functionality. Such functionality may include providing various wireless features discussed herein, including any of the features or benefits disclosed herein.

Storage 113 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 113 may store any suitable data, instructions, or information, including software and encoded logic, utilized by wireless device 110. Storage 113 may be used to store any calculations made by processor 112 and/or any data received via interface 111.

Interface 111 may be used in the wireless communication of signaling and/or data between wireless device 110 and network node 100. For example, interface 111 may perform any formatting, coding, or translating that may be needed to allow wireless device 110 to send and receive data from network node 100 over a wireless connection. Interface 111 may also include a radio transmitter and/or receiver that may be coupled to or a part of antenna 111a. The radio may receive digital data that is to be sent out to network node 101 via a wireless connection. The radio may convert the digital data into a radio signal having the appropriate channel and bandwidth parameters. The radio signal may then be transmitted via antenna 111a to network node 100.

Antenna 111a may be any type of antenna capable of transmitting and receiving data and/or signals wirelessly. In some embodiments, antenna 111a may comprise one or more omni-directional, sector or panel antennas operable to transmit/receive radio signals between 2 GHz and 66 GHz. For simplicity, antenna 111a may be considered a part of interface 111 to the extent that a wireless signal is being used.

Figure 2:
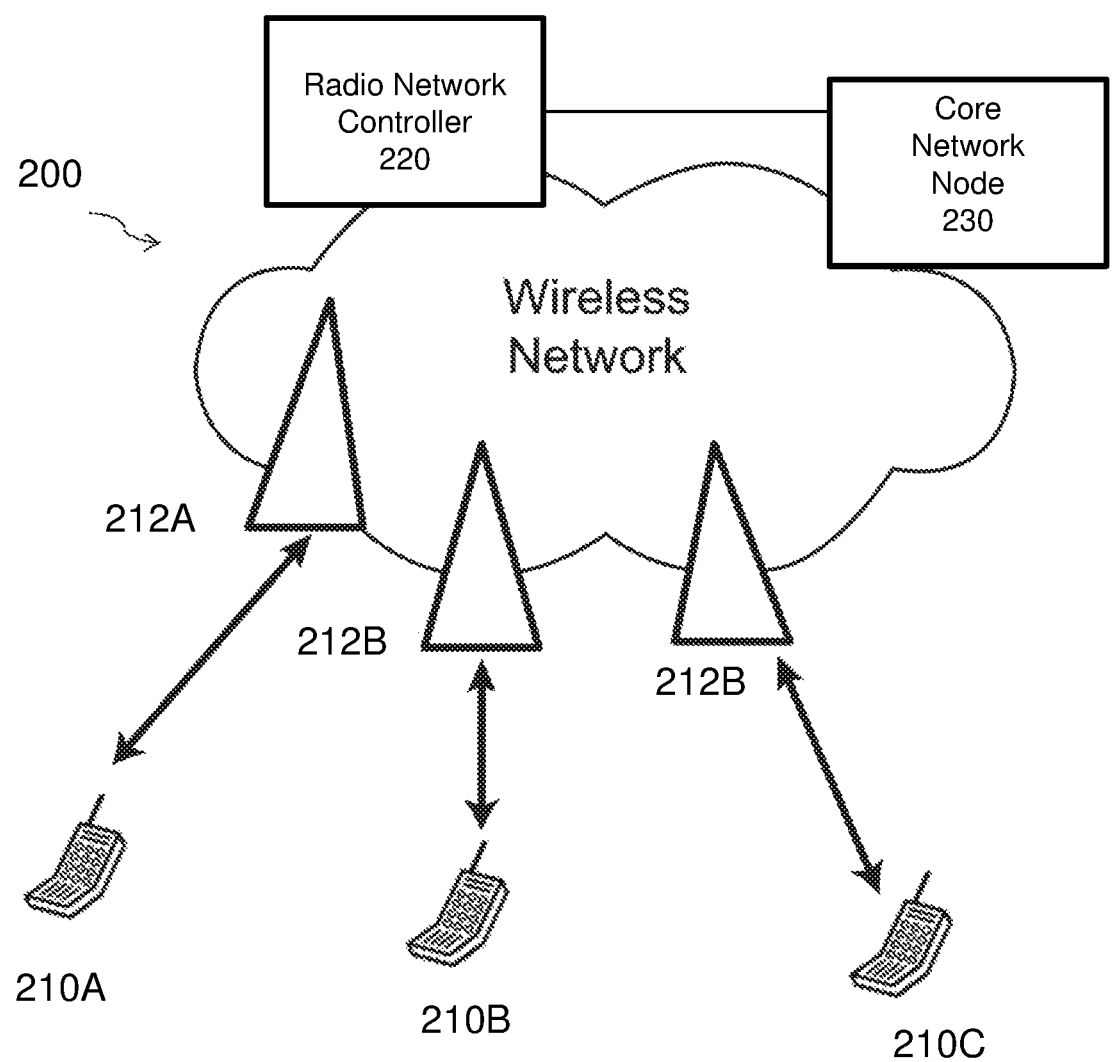
FIG. 2 illustrates another exemplary wireless communication network for avoiding bearer state mismatch, according to certain embodiments.

FIG. 2 is a block diagram illustrating another embodiment of a wireless communications network 200 for avoiding bearer state mismatch, in accordance with certain embodiments. Network 200 includes one or more wireless devices 210A-C, which may be interchangeably referred to as wireless devices 210 or UEs 210, and network nodes 212A-C, which may be interchangeably referred to as network nodes 212 or eNodeBs 212, radio network controller 220, and a core network node 230. A wireless device 210 may communicate with network nodes 212 over a wireless interface. For example, wireless device 210A may transmit wireless signals to one or more of network nodes 212, and/or receive wireless signals from one or more of network nodes 212. The wireless signals may contain voice traffic, data traffic, control signals, and/or any other suitable information. In some embodiments, an area of wireless signal coverage associated with a network node 212 may be referred to as a cell. In some embodiments, wireless devices 210 may have D2D capability. Thus, wireless devices 210 may be able to receive signals from and/or transmit signals directly to another wireless device 210. For example, wireless device 210A may be able to receive signals from and/or transmit signals to wireless device 210B.

In certain embodiments, network nodes 212 may interface with a radio network controller 220. Radio network controller 220 may control network nodes 212 and may provide certain radio resource management functions, mobility management functions, and/or other suitable functions. In certain embodiments, radio network controller 220 may interface with core network node 230 via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

Core network node 230 may manage the establishment of communication sessions and provide various other functionality for wireless device 210. Wireless device 210 exchanges certain signals with core network node 230 using the non-access stratum layer (NAS). In NAS signaling, signals between wireless communication device 210 and core network node 230 pass transparently through network nodes 212.

As described above, example embodiments of network 200 may include one or more wireless devices 210, and one or more different types of network nodes 212 capable of communicating (directly or indirectly) with wireless devices 210. Wireless device 210 may refer to any type of wireless device communicating with a node and/or with another wireless device in a cellular or mobile communication system. Examples of wireless device 210 include any of those described above with regard to wireless device 110 of FIG. 1. Likewise, examples of network node 212 may include any of those described above with regard to network nodes 100 of FIG. 1. Each of wireless communication device 210, network node 212, radio network controller 220, and core network node 230 include any suitable combination of hardware and/or software. Additional example embodiments of wireless devices 210, network nodes 212, and other network nodes (such as radio network controller or core network node) are described in more detail with respect to FIGS. 3, 6, and 9, respectively.

Although FIG. 2 illustrates a particular arrangement of network 200, the present disclosure contemplates that the various embodiments described herein may be applied to a variety of networks having any suitable configuration. For example, network 200 may include any suitable number of wireless devices 210 and network nodes 212, as well as any additional elements suitable to support communication between wireless devices or between a wireless device and another communication device (such as a landline telephone). In certain embodiments, wireless communication device 210, network node 212, radio network controller 220, and core network node 230 use any suitable radio access technology, such as long term evolution (LTE), LTE-Advanced, UMTS, HSPA, GSM, cdma2000, WiMax, WiFi, another suitable radio access technology, or any suitable combination of one or more radio access technologies. For purposes of example, various embodiments may be described within the context of certain radio access technologies. However, the scope of the disclosure is not limited to the examples and other embodiments could use different radio access technologies.

Figure 3:
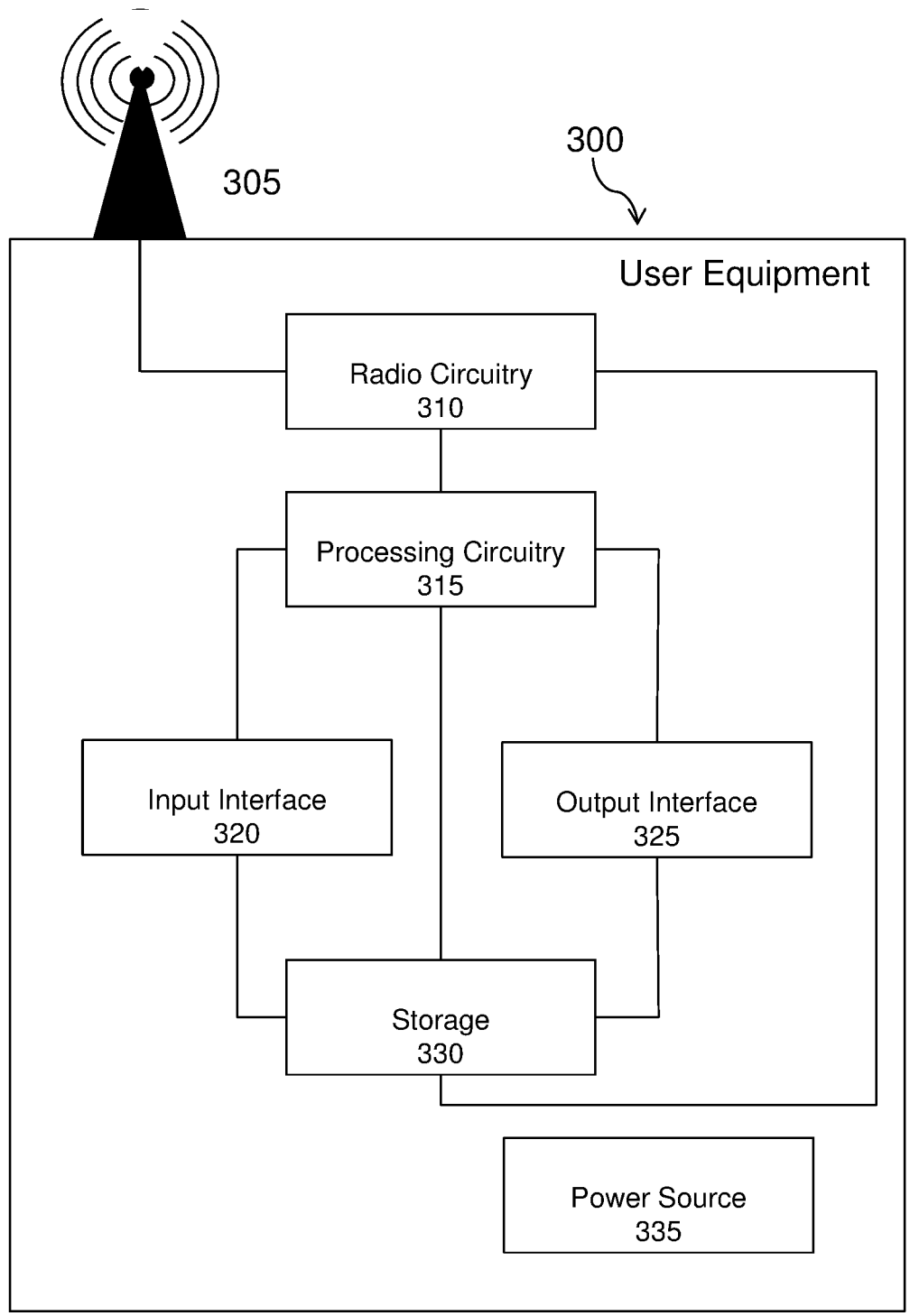
FIG. 3 illustrates an exemplary wireless device for avoiding bearer state mismatch, according to certain embodiments.

FIG. 3 illustrates an example wireless device for avoiding bearer state mismatch, in accordance with certain embodiments. As depicted, user equipment 300 is an example wireless device such as wireless device 110, 210. UE 300 includes an antenna 305, radio front-end circuitry 310, processing circuitry 315, and a computer-readable storage medium 330. Antenna 305 may include one or more antennas or antenna arrays, and is configured to send and/or receive wireless signals, and is connected to radio front-end circuitry 310. In certain alternative embodiments, wireless device 300 may not include antenna 305, and antenna 305 may instead be separate from wireless device 300 and be connectable to wireless device 300 through an interface or port.

The radio front-end circuitry 310 may comprise various filters and amplifiers, is connected to antenna 305 and processing circuitry 315, and is configured to condition signals communicated between antenna 305 and processing circuitry 315. In certain other embodiments, wireless device 300 may not include radio front-end circuitry 310, and processing circuitry 315 may instead be connected to antenna 305 without radio front-end circuitry 310.

Processing circuitry 315 may include one or more of radio frequency (RF) transceiver circuitry, baseband processing circuitry, and application processing circuitry that facilitates the transmitting wireless signals to and receiving wireless signals from network node 100, 212 via antenna 305. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. Processing circuitry 315 may include, for example, one or more central processing units (CPUs), one or more microprocessors, one or more application specific integrated circuits (ASICs), and/or one or more field programmable gate arrays (FPGAs). According to certain embodiments, processing circuitry 315 may execute instructions to provide some or all of the functionality described above as being provided by user equipment 305, and memory 530 stores the instructions executed by processor 520. Examples of a wireless device 110 are provided above In particular embodiments, some or all of the functionality described herein as being provided by a wireless device may be provided by the processing circuitry 315 executing instructions stored on a computer-readable storage medium 330. In other embodiments, some or all of the functionality may be provided by the processing circuitry 315 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 315 alone or to other components of UE 300, but are enjoyed by the wireless device as a whole, and/or by end users and the wireless network generally.

Antenna 305, radio front-end circuitry 310, and/or processing circuitry 315 may be configured to perform any receiving operations described herein as being performed by a wireless device. Any information, data and/or signals may be received from a network node and/or another wireless device.

The processing circuitry 315 may be configured to perform any determining operations described herein as being performed by a wireless device. Determining as performed by processing circuitry 315 may include processing information obtained by the processing circuitry 315 by, for example, converting the obtained information into other information, comparing the obtained information or converted information to information stored in the wireless device, and/or performing one or more operations based on the obtained information or converted information, and as a result of said processing making a determination.

Antenna 305, radio front-end circuitry 310, and/or processing circuitry 315 may be configured to perform any transmitting operations described herein as being performed by a wireless device. Any information, data and/or signals may be transmitted to a network node and/or another wireless device.

Computer-readable storage medium 330 is generally operable to store instructions, such as a computer program, software, an application including one or more of logic, rules, code, tables, algorithms, and/or other instructions capable of being executed by a processor. Examples of computer-readable storage medium 330 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 315. In some embodiments, processing circuitry 315 and computer-readable storage medium 330 may be considered to be integrated.

Alternative embodiments of UE 300 may include additional components beyond those shown in FIG. 3 that may be responsible for providing certain aspects of the UE's functionality, including any of the functionality described herein and/or any functionality necessary to support the solution described above. As just one example, UE 300 may include input interfaces, devices and circuits, and output interfaces, devices and circuits. Input interfaces, devices, and circuits are configured to allow input of information into UE 300, and are connected to processing circuitry 315 to allow processing circuitry 315 to process the input information. For example, input interfaces, devices, and circuits may include a microphone, a proximity or other sensor, keys/buttons, a touch display, one or more cameras, a USB port, or other input elements. Output interfaces, devices, and circuits are configured to allow output of information from UE 300, and are connected to processing circuitry 315 to allow processing circuitry 315 to output information from UE 300. For example, output interfaces, devices, or circuits may include a speaker, a display, vibrating circuitry, a USB port, a headphone interface, or other output elements. Using one or more input and output interfaces, devices, and circuits, UE 300 may communicate with end users and/or the wireless network, and allow them to benefit from the functionality described herein.

As another example, UE 300 may include power source 335. Power source 335 may comprise power management circuitry. Power source 335 may receive power from a power supply, which may either be comprised in, or be external to, power source 335. For example, UE 300 may comprise a power supply in the form of a battery or battery pack which is connected to, or integrated in, power source 335. Other types of power sources, such as photovoltaic devices, may also be used. As a further example, UE 300 may be connectable to an external power supply (such as an electricity outlet) via an input circuitry or interface such as an electrical cable, whereby the external power supply supplies power to power source 335. Power source 335 may be connected to radio front-end circuitry 310, processing circuitry 315, and/or computer-readable storage medium 330 and be configured to supply UE 300, including processing circuitry 315, with power for performing the functionality described herein.

UE 300 may also include multiple sets of processing circuitry 315, computer-readable storage medium 330, radio circuitry 310, and/or antenna 305 for different wireless technologies integrated into wireless device 300, such as, for example, GSM, WCDMA, LTE, NR, WiFi, or Bluetooth wireless technologies. These wireless technologies may be integrated into the same or different chipsets and other components within wireless device 300.

Figure 4:
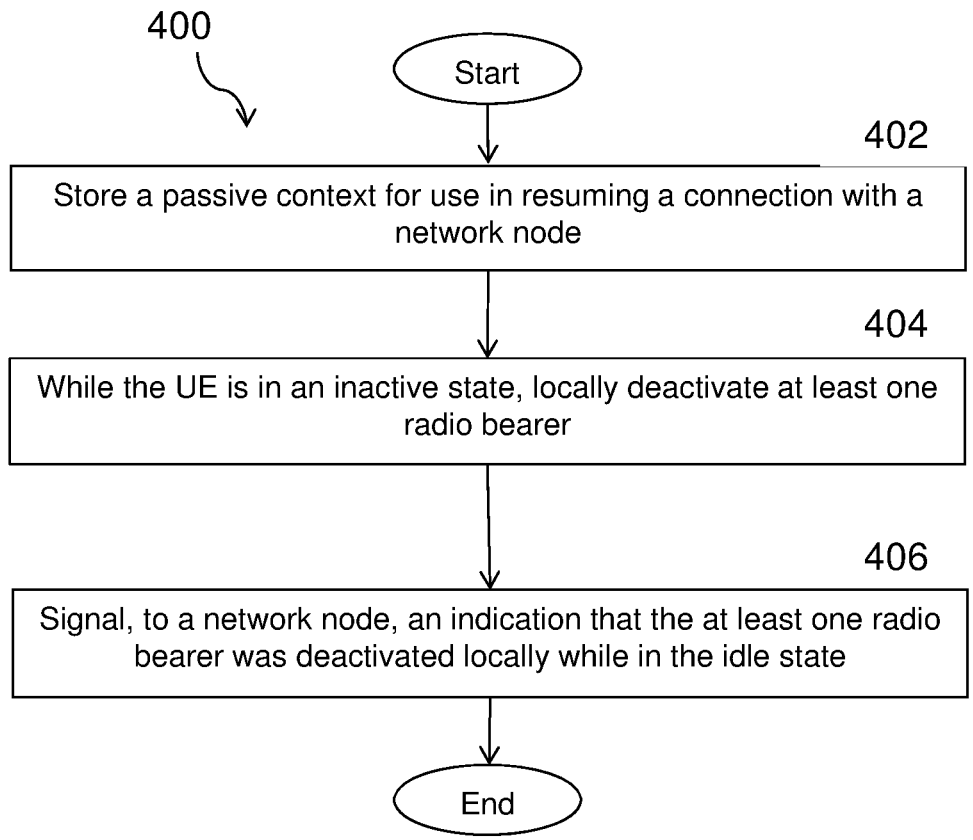
FIG. 4 illustrates an exemplary method by a wireless device for avoiding bearer state mismatch, according to certain embodiments.

FIG. 4 illustrates an exemplary method 400 by a user equipment 300 for avoiding bearer state mismatch, in accordance with certain embodiments. The method begins at step 402 when UE 300 stores a passive context for use in resuming a connection with a network node 100, 212. In a particular embodiment, the connection may include a suspended RRC connection. In a particular embodiment, the passive context may include one or more resources for use in resuming the connection with the network node (100, 212), and the one or more resources may include the at least one RB.

At step 404, while UE 300 is in an inactive state, UE 300 locally deactivates at least one RB without providing notification to the network node 100, 212 that the at least one RB can no longer be used by the UE 300.

At step 406, prior to resuming the connection with network node 100, 212, UE 300 signals, to the network node 100, 212, an indication that the at least one RB has been deactivated locally. According to certain particular embodiments, the indication that the at least one RB has been deactivated locally is included with a request to resume the connection with the network node (100, 212). For example, the indication may be signaled with a request for a new RRC connection. In another embodiment, the indication may be included with a confirmation of a successful transition of the connection from the inactive state to a connected state. In yet another embodiment, the indication may be signaled when the UE (110, 210) accesses the network in which the UE (110, 210) is registered and was previously connected or active.

Figure 5:
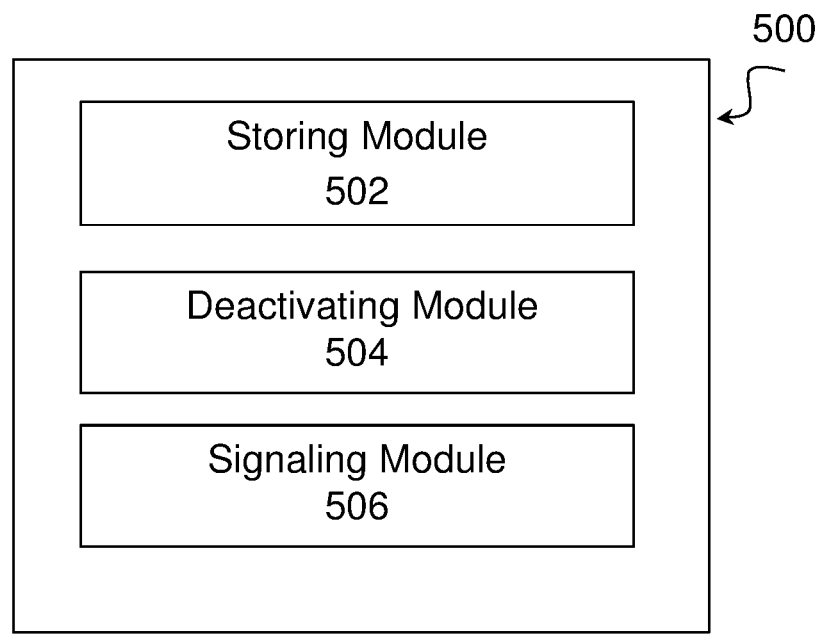
FIG. 5 illustrates an exemplary virtual computing device for avoiding bearer state mismatch, according to certain embodiments.

In certain embodiments, the method for avoiding bearer state mismatch as described above may be performed by a virtual computing device. FIG. 5 illustrates an example virtual computing device 500 for avoiding bearer state mismatch, according to certain embodiments. In certain embodiments, virtual computing device 500 may include modules for performing steps similar to those described above with regard to the method illustrated and described in FIG. 4. For example, virtual computing device 500 may include a storing module 502, a deactivating module 504, a signaling module 506, and any other suitable modules for avoiding bearer state mismatch. In some embodiments, one or more of the modules may be implemented using processing circuitry 315 of FIG. 3 or processor 112 of FIG. 1. In certain embodiments, the functions of two or more of the various modules may be combined into a single module.

The storing module 502 may perform the storing functions of virtual computing device 500. For example, in a particular embodiment, storing module 502 may store a passive context for use in resuming a connection with a network node 100, 212.

The deactivating module 504 may perform the deactivating functions of virtual computing device 500. For example, in a particular embodiment, while the UE 300 is in an inactive state, deactivating module 504 may deactivate at least one RB without providing notification to the network node 100, 212 that the at least one RB can no longer be used by the UE 300.

The signaling module 506 may perform the signaling functions of virtual computing device 500. For example, in a particular embodiment, signaling module 506 may, prior to resuming the connection with network node 100, 212, signal to the network node 100, 212 an indication that the at least one RB has been deactivated locally.

Other embodiments of virtual computing device 500 may include additional components beyond those shown in FIG. 5 that may be responsible for providing certain aspects of the wireless device's functionality, including any of the functionality described above and/or any additional functionality (including any functionality necessary to support the solutions described above). The various different types of wireless devices may include components having the same physical hardware but configured (e.g., via programming) to support different radio access technologies, or may represent partly or entirely different physical components.

Figure 6:
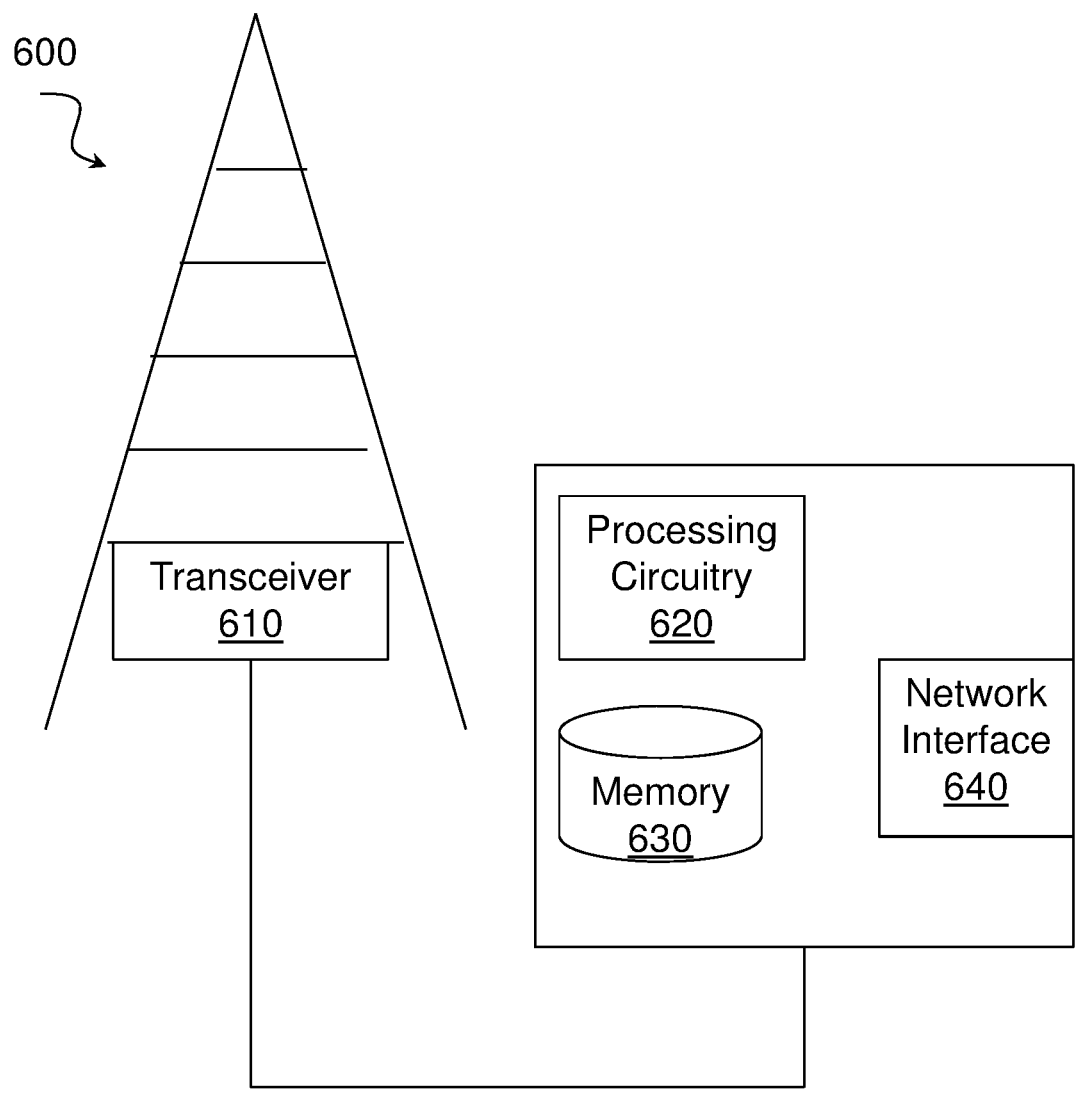
FIG. 6 illustrate an exemplary network node for avoiding bearer state mismatch, according to certain embodiments.

FIG. 6 illustrate an example network node 600 for avoiding bearer state mismatch, according to certain embodiments. As depicted, network node 600 is an example network node such as network node 100, 212 and may be any type of radio network node or any network node that communicates with a wireless device and/or with another network node. Examples of a network node 100, 212 are provided above.

Network nodes 600 may be deployed throughout network 100 as a homogenous deployment, heterogeneous deployment, or mixed deployment. A homogeneous deployment may generally describe a deployment made up of the same (or similar) type of network nodes 600 and/or similar coverage and cell sizes and inter-site distances. A heterogeneous deployment may generally describe deployments using a variety of types of network nodes 600 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 600 may include one or more of transceiver 610, processing circuitry 620, memory 630, and network interface 640. In some embodiments, transceiver 610 facilitates transmitting wireless signals to and receiving wireless signals from a wireless device (e.g., via an antenna), processing circuitry 620 executes instructions to provide some or all of the functionality described above as being provided by a network node 600, memory 630 stores the instructions executed by processing circuitry 620, and network interface 640 communicates signals to backend network components, such as a gateway, switch, router, Internet, Public Switched Telephone Network (PSTN), core network nodes or radio network controllers, etc.

In certain embodiments, network node 600 may be capable of using multi-antenna techniques, and may be equipped with multiple antennas and capable of supporting MIMO techniques. The one or more antennas may have controllable polarization. In other words, each element may have two co-located sub elements with different polarizations (e.g., 90 degree separation as in cross-polarization), so that different sets of beamforming weights will give the emitted wave different polarization.

Processing circuitry 620 may include any suitable combination of hardware and software implemented in one or more modules to execute instructions and manipulate data to perform some or all of the described functions of network node 600. In some embodiments, processing circuitry 620 may include, for example, one or more computers, one or more central processing units (CPUs), one or more microprocessors, one or more applications, and/or other logic.

Memory 630 is generally operable to store instructions, such as a computer program, software, an application including one or more of logic, rules, algorithms, code, tables, etc. and/or other instructions capable of being executed by a processor. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 640 is communicatively coupled to processing circuitry 620 and may refer to any suitable device operable to receive input for network node 600, send output from network node 600, perform suitable processing of the input or output or both, communicate to other devices, or any combination of the preceding. Network interface 640 may include appropriate hardware (e.g., port, modem, network interface card, etc.) and software, including protocol conversion and data processing capabilities, to communicate through a network.

Other embodiments of network node 600 may include additional components beyond those shown in FIG. 6 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components. Additionally, the terms first and second are provided for example purposes only and may be interchanged.

Figure 7:
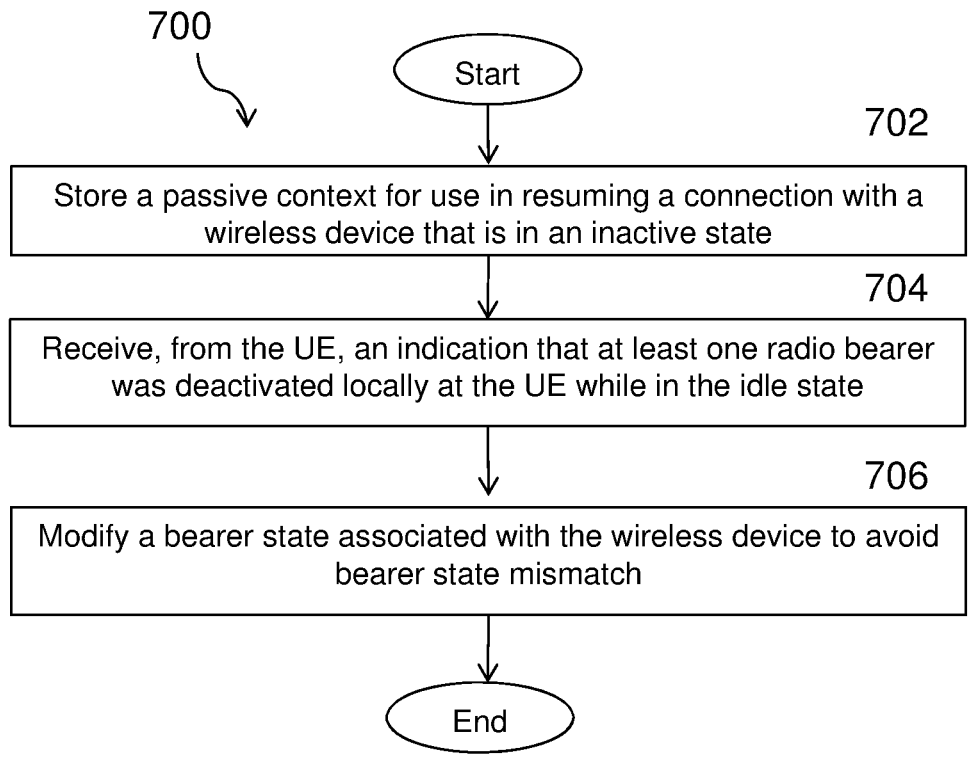
FIG. 7 illustrates an example method by a network node for avoiding bearer state mismatch, according to certain embodiments.

FIG. 7 illustrates an example method 700 by a network node 600 for avoiding bearer state mismatch, according to certain embodiments. The method begins at step 702 when a network node 600 stores a passive context for use in resuming a connection with a UE 300 that is in an inactive state. In a particular embodiment, the passive context may include one or more resources for use in resuming the connection with the network node 600, and the one or more resources comprise the at least one radio bearer.

At step 702, prior to the UE 300 attempting to resume the connection and while the UE is in the inactive state, network node 600 receives from the UE 300 an indication that at least one radio bearer has been deactivated locally at the UE 300. According to particular embodiments, the indication may be included with a request to resume the connection with the network node 600, a confirmation of a successful transition of UE 300 from the inactive state to a connected state, or a request for a new RRC connection.

At step 704, network node 600 modifies a bearer state associated with the UE 300 to avoid bearer state mismatch. In a particular embodiment, modifying the bearer state may include releasing the at least one radio bearer identified in the indication and/or releasing the at least one radio bearer identified in the indication and all other radio bearers associated with the UE 300. Additionally or alternatively, network node 600 may suspend reestablishment of the at least one radio bearer identified in the indication or suspend reestablishment of the at least one radio bearer identified in the indication and all other radio bearers associated with the UE 300. In other embodiments, network node 600, may additionally or alternatively delay reestablishment of the at least one radio bearer identified in the indication or delay reestablishment of all radio bearers associated with the UE 300 and/or send a failure response to the UE 300 to notify UE 300 that the connection cannot be reestablished.

Though not depicted, the method may further include the network node 600 transmitting a first message to a core node 230 that indicates that the bearer state has been modified and requests updated bearer state information. Network node 600 may then receive a second message from the core node 230 that includes the updated bearer state information. Network node 600 may then configure UE 300 with the updated bearer state information.

Figure 8:
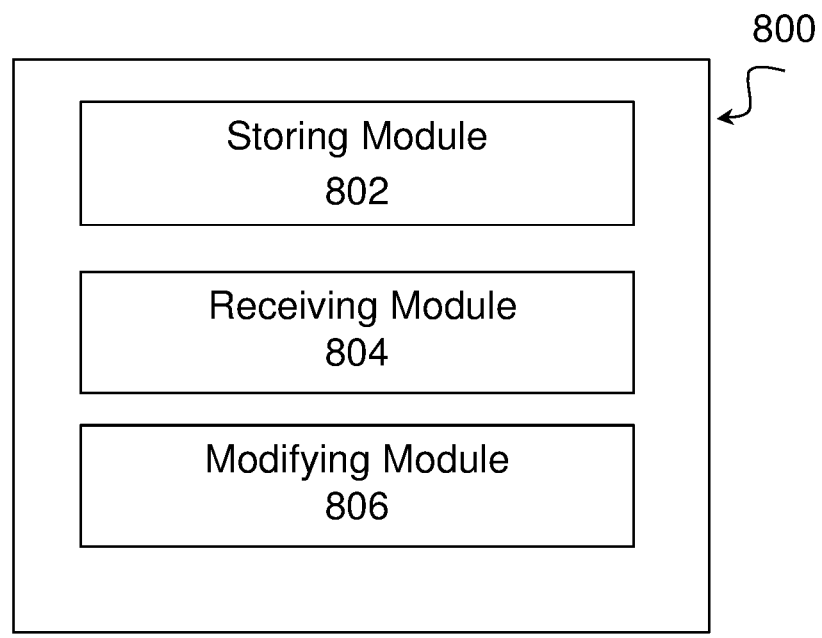
FIG. 8 illustrates another example virtual computing device for avoiding bearer state mismatch, according to certain embodiments.

In certain embodiments, the method for avoiding bearer state mismatch as described above may be performed by a virtual computing device. FIG. 8 illustrates an example virtual computing device 800 for avoiding bearer state mismatch, according to certain embodiments. In certain embodiments, virtual computing device 800 may include modules for performing steps similar to those described above with regard to the method illustrated and described in FIG. 7. For example, virtual computing device 800 may include at least one storing module 802, a receiving module 804, a modifying module 806, and any other suitable modules for avoiding bearer state mismatch. In some embodiments, one or more of the modules may be implemented using processing circuitry 620 of FIG. 6 or processor 102 of FIG. 1. In certain embodiments, the functions of two or more of the various modules may be combined into a single module.

The storing module 802 may perform the storing functions of virtual computing device 800. For example, in a particular embodiment, storing module 802 may store a passive context for use in resuming a connection with a UE 300 that is in an inactive state. In a particular embodiment, the passive context may include one or more resources for use in resuming the connection with the network node 600, and the one or more resources comprise the at least one radio bearer.

The receiving module 804 may perform the receiving functions of virtual computing device 800. For example, in a particular embodiment, receiving module 804 may, prior to the UE 300 attempting to resume the connection and while the UE is in the inactive state, receive from the UE 300 an indication that at least one radio bearer has been deactivated locally at the UE 300.

The modifying module 806 may perform the modifying functions of virtual computing device 800. For example, in a particular embodiment, modifying module 806 may modify a bearer state associated with the UE 300 to avoid bearer state mismatch. As just one example, modifying module 806 may modify the bearer state may include releasing the at least one radio bearer identified in the indication and/or releasing the at least one radio bearer identified in the indication and all other radio bearers associated with the UE 300.

Other embodiments of virtual computing device 800 may include additional components beyond those shown in FIG. 8 that may be responsible for providing certain aspects of the network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 9:
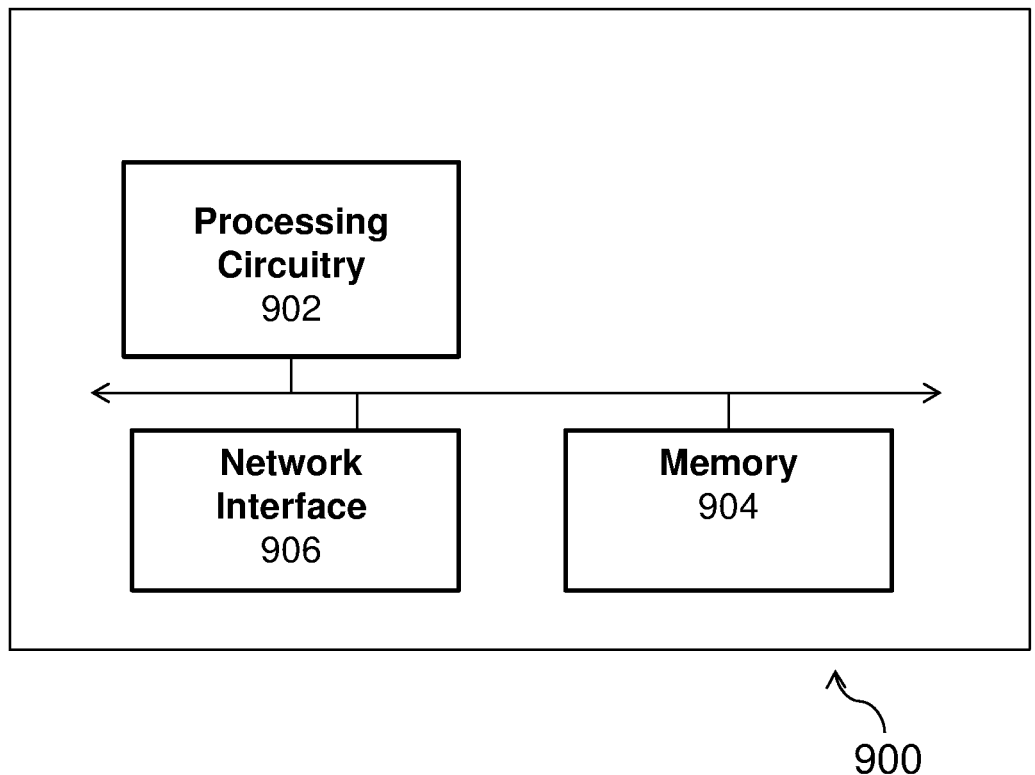
FIG. 9 illustrates an exemplary radio network controller or core network node, according to certain embodiments.

FIG. 9 illustrates an exemplary radio network controller or core network node, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 900 include processing circuitry 902, memory 904, and network interface 906. In some embodiments, processing circuitry 902 executes instructions to provide some or all of the functionality described above as being provided by the network node, memory 904 stores the instructions executed by processing circuitry 902, and network interface 906 communicates signals to any suitable node, such as a gateway, switch, router, Internet, Public Switched Telephone Network (PSTN), network nodes, radio network controllers or core network nodes 900, etc.

Processing circuitry 902 may include any suitable combination of hardware and software implemented in one or more modules to execute instructions and manipulate data to perform some or all of the described functions of the radio network controller or core network node 900. In some embodiments, processing circuitry 902 may include, for example, one or more computers, one or more central processing units (CPUs), one or more microprocessors, one or more applications, and/or other logic.

Memory 904 is generally operable to store instructions, such as a computer program, software, an application including one or more of logic, rules, algorithms, code, tables, etc. and/or other instructions capable of being executed by a processor. Examples of memory 904 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 906 is communicatively coupled to processing circuitry 902 and may refer to any suitable device operable to receive input for the network node, send output from the network node, perform suitable processing of the input or output or both, communicate to other devices, or any combination of the preceding. Network interface 906 may include appropriate hardware (e.g., port, modem, network interface card, etc.) and software, including protocol conversion and data processing capabilities, to communicate through a network.

Other embodiments of the network node may include additional components beyond those shown in FIG. 9 that may be responsible for providing certain aspects of the network node's functionality, including any of the functionality described above and/or any additional functionality (including any functionality necessary to support the solution described above).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any appropriate steps, methods, or functions may be performed through a computer program product that may, for example, be executed by the components and equipment illustrated in one or more of the figures above. As just one example, storage 330 may comprise computer readable means on which a computer program can be stored. The computer program may include instructions which cause processing circuitry 315 (and any operatively coupled entities and devices) to execute methods according to embodiments described herein. The computer program and/or computer program product may thus provide means for performing any steps herein disclosed.

Certain aspects of the inventive concept have mainly been described above with reference to a few embodiments. However, as is readily appreciated by a person skilled in the art, embodiments other than the ones disclosed above are equally possible and within the scope of the inventive concept. Similarly, while a number of different combinations have been discussed, all possible combinations have not been disclosed. One skilled in the art would appreciate that other combinations exist and are within the scope of the inventive concept. Moreover, as is understood by the skilled person, the herein disclosed embodiments are as such applicable also to other standards and communication systems and any feature from a particular figure disclosed in connection with other features may be applicable to any other figure and or combined with different features.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method by user equipment (UE) for avoiding bearer state mismatch, the method comprising:
   storing, by the UE, a passive context for use in resuming a connection with a Radio Access Network (RAN) node, the passive context comprising at least one radio bearer (RB) for use in resuming the connection with the RAN node,
   while the UE is in an inactive state, locally deactivating, by the UE, the at least one RB associated with the passive context; and
   signaling, to the RAN node, an indication that the at least one RB associated with the passive context and for use in resuming the connection with the RAN node was deactivated locally while in the inactive state.

2. The method of claim 1, wherein the indication that the at least one RB has been deactivated locally is included with a request to resume the connection with the RAN node.

3. The method of claim 1, wherein the indication that the at least one RB has been deactivated locally is included with a confirmation of a successful transition from the inactive state to a connected state.

4. A user equipment (UE) for avoiding bearer state mismatch, the UE comprising:
   a memory storing instructions; and
   processing circuitry configured to execute the instructions to cause the UE to:
   store a passive context for use in resuming a connection with Radio Access Network (RAN) node, the passive context comprising at least one radio bearer (RB) for use in resuming the connection with the RAN node;
   while the UE is in an inactive state, locally deactivate, at the UE, the at least one RB associated with the passive context; and
   signal, to the RAN node, an indication that the at least one RB associated with the passive context and for use in resuming the connection with the RAN node was deactivated locally while in the inactive state.

5. The UE of claim 4, wherein the indication that the at least one RB has been deactivated locally is included with a request to resume the connection with the RAN node.

6. The UE of claim 4, wherein the indication that the at least one RB has been deactivated locally is included with a confirmation of a successful transition from the inactive state to a connected state.

7. The UE of claim 4, wherein the indication that the at least one RB has been deactivated locally is signaled when the UE accesses a network with which the UE was previously connected before transitioning into the inactive state.

8. The UE of claim 4, wherein the indication that the at least one RB has been deactivated locally is signaled with a request for a new RRC connection.

9. The UE of claim 4, wherein the connection comprises a suspended RRC connection.

10. The UE of claim 4, wherein the inactive state comprises one of:
    RRC idle state;
    RRC suspended state; or
    RRC inactive state.

11. A method by a Radio Access Network (RAN) node for avoiding bearer state mismatch, the method comprising:
    storing, by the RAN node, a passive context for use in resuming a connection with a user equipment (UE) that is in an inactive state, the passive context comprising at least one radio bearer (RB) for use in resuming the connection with the RAN node;
    receiving, from the UE, an indication that the at least one RB associated with the passive context and for use in resuming the connection with the RAN node was deactivated locally at the UE while in the inactive state; and
    modifying a bearer state associated with the UE to avoid bearer state mismatch.

12. A Radio Access Network (RAN) node for avoiding bearer state mismatch, the RAN node comprising:
    a memory storing instructions; and
    processing circuitry configured to execute the instructions to cause the RAN node to:
    store a passive context for use in resuming a connection with a user equipment (UE) that is in an inactive state, the passive context comprising at least one radio bearer (RB) for use in resuming the connection with the RAN node;
    receive, from the UE, an indication that at least one RB associated with the passive context and for use in resuming the connection with the RAN node was deactivated locally at the UE while in the inactive state; and
    modify a bearer state associated with the UE to avoid bearer state mismatch.

13. The RAN node of claim 12, wherein, when modifying the bearer state, the processing circuitry is configured to execute the instructions to cause the RAN node to:
    release the at least one radio bearer identified in the indication;
    release the at least one RB identified in the indication and all other radio bearers associated with the UE;
    suspend reestablishment of the at least one RB identified in the indication;
    suspend reestablishment of the at least one RB identified in the indication and all other RBs associated with the UE;
    delay reestablishment of the at least one RB identified in the indication;
    delay reestablishment of all RBs associated with the UE; and
    send a failure response to the UE to notify the UE that the connection cannot be reestablished.

14. The RAN node of claim 12, wherein the processing circuitry is configured to execute the instructions to cause the RAN node to:
   transmit a first message to a core node, the first message indicating that the bearer state has been modified and requesting updated bearer state information.

15. The RAN node of claim 14, wherein the processing circuitry is configured to execute the instructions to cause the RAN node to:
   receiving a second message from the core node, the second message comprising the updated bearer state information; and
   configuring the UE with the updated bearer state information.

16. The RAN node of claim 12, wherein the indication that the at least one RB has been deactivated locally is included with a message selected from the group consisting of:
   a request to resume the connection with the RAN node;
   a confirmation of a successful transition of the UE from the inactive state to a connected state; and
   a request for a new RRC connection.

17. The RAN node of claim 12, wherein the inactive state comprises one of:
   RRC idle state;
   RRC suspended state; or
   RRC inactive state.

* * * * *